(12) United States Patent
Kelley et al.

(10) Patent No.: US 7,984,382 B2
(45) Date of Patent: Jul. 19, 2011

(54) USER INTERFACE ACTION PROCESSING USING A FRESHNESS STATUS

(75) Inventors: Brian Harold Kelley, San Diego, CA (US); Jason Miller, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 994 days.

(21) Appl. No.: 10/854,977

(22) Filed: May 26, 2004

(65) Prior Publication Data

US 2005/0268004 A1    Dec. 1, 2005

(51) Int. Cl.
 *G06F 3/01* (2006.01)
 *G06F 3/048* (2006.01)
(52) U.S. Cl. .................... 715/769; 715/702; 715/772
(58) Field of Classification Search .......... 715/772, 715/702, 863, 864, 541, 769; 710/54; 178/20.03
See application file for complete search history.

(56) References Cited

U.S. PATENT DOCUMENTS

| | | | | |
|---|---|---|---|---|
| 5,010,482 A | * | 4/1991 | Keller et al. | 710/52 |
| 5,799,315 A | * | 8/1998 | Rainey et al. | 707/102 |
| 5,890,181 A | * | 3/1999 | Selesky et al. | 715/255 |
| 6,675,352 B1 | * | 1/2004 | Osaki et al. | 715/512 |
| 6,938,174 B2 | | 8/2005 | LeKuch et al. | |
| 2002/0081004 A1 | * | 6/2002 | Yoshii et al. | 382/119 |
| 2004/0233197 A1 | * | 11/2004 | Liu et al. | 345/442 |
| 2004/0257346 A1 | * | 12/2004 | Ong et al. | 345/179 |

FOREIGN PATENT DOCUMENTS

| | | |
|---|---|---|
| JP | 11065752 | 3/1999 |
| JP | 2003308169 | 10/2003 |

OTHER PUBLICATIONS

Supplementary European Search Report—EP05772517, Search Authority—Munich Patent Office—Sep. 29, 2008.

* cited by examiner

*Primary Examiner* — Kieu Vu
*Assistant Examiner* — Blaine Basom
(74) *Attorney, Agent, or Firm* — Brent A. Boyd; Nicholas A. Cole

(57) ABSTRACT

A system for processing user interface actions generated from a user interface device, including generating a freshness status for the user interface action. The freshness status indicates a freshness state associated with the user interface action. The freshness status is associated wit the user interface action.

21 Claims, 7 Drawing Sheets

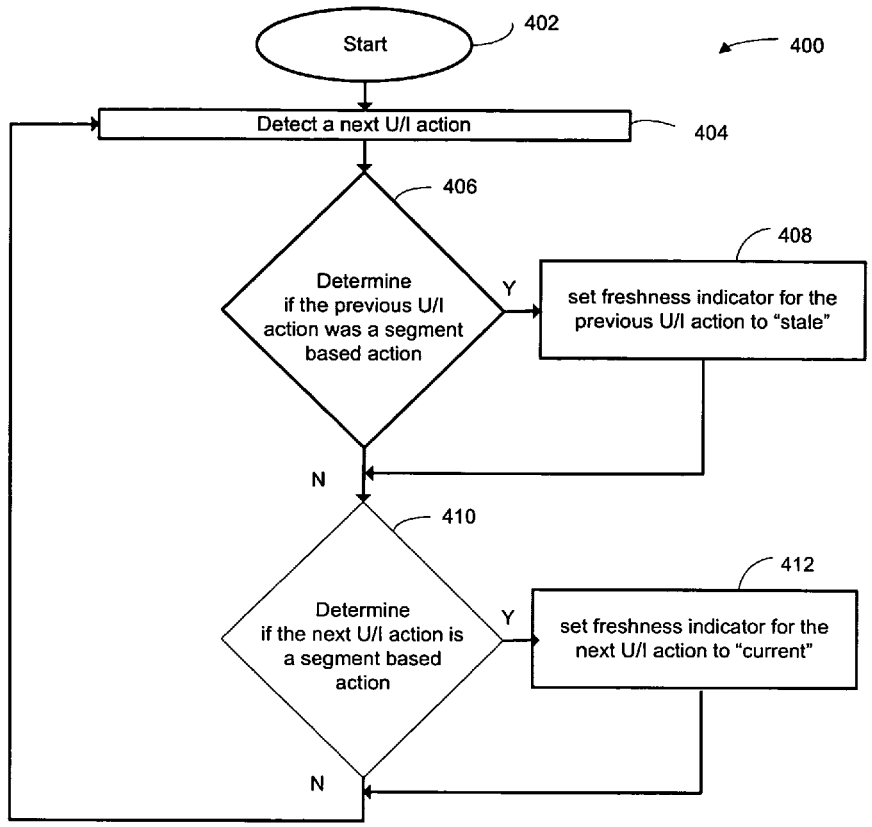
FIG.4
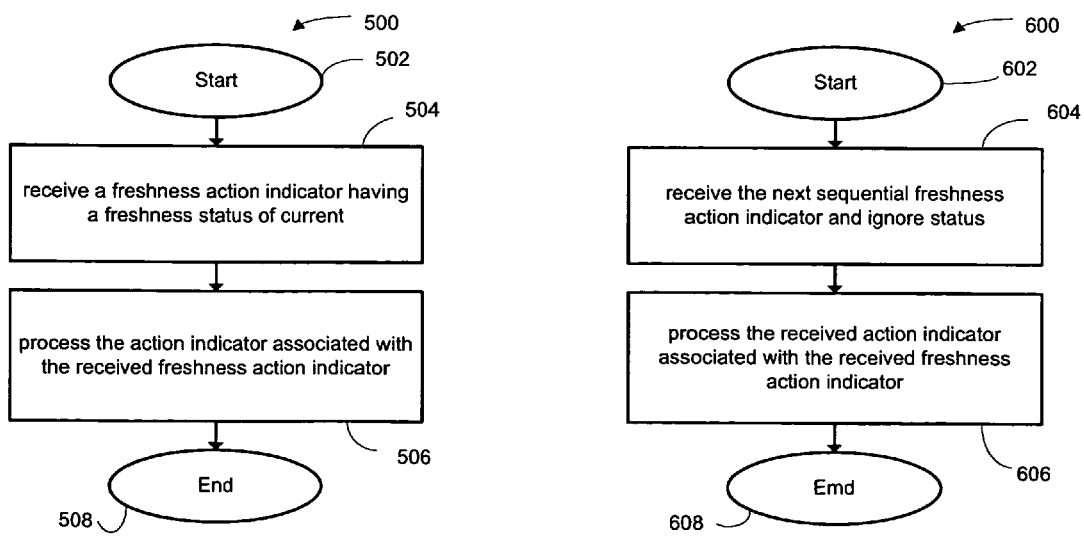
FIG. 5
FIG. 6

USER INTERFACE ACTION PROCESSING USING A FRESHNESS STATUS

BACKGROUND

1. Field

The present invention relates generally to the processing of user interface actions, and more specifically, to the selective providing of user interface actions to associated applications.

2. Background

Advances in technology have resulted in smaller and more powerful personal computing devices. For example, there currently exist a variety of portable wireless telephones, personal digital assistants (PDAs), and paging devices that are small, lightweight, and can be easily carried by users. Typically, these devices are severely resource constrained. For example, the screen size, amount of available memory and file system space, amount of input and output capabilities and processing capability may be each limited by the small size of the device. Further, although all types of computing devices, including both severely and non-severely resource constrained devices, generally reap the benefit from the introduction of new computing techniques that provide increased computing capabilities within a current or smaller space requirements, it is the typically the severely constrained devices that benefit the most.

Currently, a wide variety of computing devices, including some personal computing devices, contain computing capabilities that include user interface (U/I) systems that track and record U/I events/actions. Such events/actions typically include key strokes and pointer (mouse or pen) movements and each event/action has its own corresponding event/action code. Pointer movements, for example, are known to have several event/action types (pen events/actions), including: pen-up, pen-down and pen-drag. Event/action codes are typically generated by the periodic polling of the corresponding U/I devices by the U/I system. For example, if a pen is detected to have changed its contact position with respect to a previous position in a previous time period, then an event/action code is generated by the U/I system where the event/action code uniquely identifies the event/action as a pen-drag with a current pen location of (x,y).

As noted above, events/actions are generated based on the periodic sampling of the corresponding U/I device. Typically, sampling periods are set to a length that is determined to be neither too short nor too long with respect to operations performed by average applications. If set to be too short, pointer movement events/actions generated, for example, may be so numerous as to overwhelm an application such that the corresponding application, for example, spends a large portion of time displaying each of the event/action locations while either the pointer continues to generate additional events/actions or while the user waits for the screen to catch-up with the actions of the user. Although efforts can be made to attempt to handle the massive data, either by, for example, simply dropping events/actions as they occur (i.e., failing to queue them once the queue/buffer reaches a certain size), or doing nothing and simply allowing the display to significantly lag behind the user's actions, neither of the corresponding outcomes represent an acceptable solution. If, in contrast, the period is set to be too long, applications that require higher resolution data, for example, handwriting recognition software, would not have sufficient data available to perform as desired.

One popular approach is the tracking of events/actions by providing both high-resolution and low-resolution buffers. In one embodiment, a high-resolution buffer tends to be associated with software having a higher sampling rate while a low-resolution buffer tends to be associated with software having a lower sampling rate. In at least some embodiments, the items captured in the high-resolution buffer are referred to as actions, while the items captured in the low-resolution buffer are referred to as events. In one such embodiment the events are a subset of the actions. In one embodiment, the most recent, or "current" action/event can be determined by examining the item located at the top of the corresponding buffer. In at least one embodiment, the high-resolution buffer is associated with a sampling rate of 100 Hertz and is associated with a handwriting sampling program.

Those systems implementing both the high and low-resolution buffers described above, also are known to be designed to provide workable solutions for applications requiring high-resolution data, such as handwriting recognition software, by providing optional access to the high-resolution buffer that can be separately accessed to retrieve the higher resolution data. As such, although many applications operate satisfactorily using solely the low-resolution buffer, other higher-resolution based applications achieve better results using the separate high-resolution buffer. Therefore, generally, systems that handle event code information identifying U/I event information, are known to contain both a high and low-resolution buffers, one for typical applications generally concerned with "current" events, and another for higher-resolution based applications that are concerned with more than just "current" events. The providing of both high and low-resolution solutions requires additional coding, data structure and processing capabilities than would be necessary if a working single buffer solution was available.

Another approach of handling the potential problems of the generation of a large backlog of events/actions is to push the responsibility of handling the backlog to the individual applications. However, this complicates the design of such applications, and introduces the possibility of having resulting different behaviors of the same application on different devices.

There is therefore a need in the art for a reduced resource intensive U/I event/action processing system that provides applications action/event data in a form that is acceptable for all applications, whether such systems require high-resolution information or whether such systems require only current location information. There is also therefore a further need to reduce the duplicative nature of storing actions in both an actions buffer and an events queue.

SUMMARY

Embodiments disclosed herein address the above stated needs including, for example, one or more embodiments, in which methods, software and apparatus, are used to process U/I actions generated from a U/I device.

In at least one embodiment, the processing of the U/I actions includes generating a freshness status for the U/I action wherein the freshness status indicates a freshness state associated with the U/I action. In addition, the freshness status is also associated with the U/I action.

In at least one embodiment, the processing of the U/I actions includes receiving a U/I action indicator associated with a U/I action. In addition, a freshness status associated with the U/I action is also received.

In at least one embodiment, the processing of the U/I actions includes generating a freshness status for a U/I action wherein the freshness status indicates a freshness state associated with the U/I action. In addition, the freshness status is associated with the U/I action. In addition, a U/I action indicator associated with the U/I action is received. Finally, the freshness status is received.

In at least one embodiment, a computing device is used to process U/I actions generated from a U/I device. The computing device having a memory, a U/I interface and a processor. The U/I interface configured to receive U/I action signals from a U/I device. The processor is coupled to the memory and operable to execute code to generate the freshness status for the U/I action. The processor is operable to associate the freshness status with the U/I action to form a freshness action indicator. Further, the processor is operable to provide the freshness action indicator to an application for processing.

In at least one embodiment, a computing device is used to process U/I actions generated from a U/I device. The computing device having a memory, a U/I action buffer and a processor. The U/I action buffer is configured to store freshness action indicators. The processor is coupled to the memory and operable to execute code to receive a U/I action indicator associated with a U/I action. Further, the processor is operable to receive a freshness status associated with the U/I action.

In at least one embodiment, a computing device is used to process U/I actions generated from a U/I device. The computing device having a memory, a user I/O interface and a processor. The user I/O interface configured to receive U/I action signals from a U/I device. The processor is coupled to the memory and operable to execute code to generate the freshness status for the U/I action. The processor is operable to associate the freshness status with the U/I action to form a freshness action indicator. Further, the processor is operable to store the freshness action indicator in the U/I action buffer. The processor is also operable to receive a U/I action indicator associated with a U/I action. Further, the processor is operable to receive a freshness status associated with the U/I action.

At least one advantage of at least one embodiment includes providing the ability to only process those U/I action indicators needed by a particular application. Applications that only need U/I action indicators having an associated "current" status, can easily receive only such data. However, applications needing a wider amount of U/I action indicators, for example all such U/I action indicators, also can easily receive only such desired data.

In at least one embodiment, the applications using the U/I action indicators, does not retrieve/receive the U/I action indicators separately from an associated status, but rather the associated status is contained within the U/I action indicator that is retrieved/received at the application. As such, no separate call, query or other like action is needed to separately retrieve such status information. In at least one embodiment, the U/I action indicator containing the associated status is received at the associated application rather than the application receiving such data from the corresponding buffer.

At least one advantage of at least one embodiment includes the lack of need for the use of a second low-resolution buffer (events queue). Such embodiments use only a high-resolution buffer (actions buffer) without additional need of a separate low-resolution buffer and separate processing for both the separate events queue and the separate actions buffer. At least one advantage of at least one embodiment is providing additional processing control to applications. Rather than requiring applications to process through U/I indicators that they need not process to achieve their desired function, such embodiment instead provides additional control to process only that data that is necessary. At least one advantage of at least one embodiment is reducing the amount of resources necessary to process U/I action indicators. The need for only an actions buffer, rather than both an actions buffer and an events queue, reduces the required resources. Further, only one type of processing is needed to process U/I action indicators as all such data is always found in only one place, the high-resolution buffer (actions buffer).

Other aspects, advantages, and features of the present invention will become apparent after review of the entire application, including the following sections: Brief Description of the Drawings, Detailed Description, and the claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein:

FIG. 4 shows a flow chart of one embodiment of a method of processing U/I actions generated from a U/I device;

FIG. 5 shows a flow chart of one embodiment of a method of processing U/I actions generated from a U/I device;

FIG. 6 shows a flow chart of one embodiment of a method of processing U/I actions generated from a U/I device;

DETAILED DESCRIPTION

The word "exemplary" is used herein to mean "serving as an example, instance, or illustration." Any embodiment described herein as "exemplary" is not necessarily to be construed as preferred or advantageous over other embodiments.

The following detailed description describes methods, software and apparatus used to process U/I actions generated from a U/I device on a computing device, including methods, software and apparatus, for processing of pen event actions using freshness status associated with such pen event actions. In one or more embodiments, the computing device has an embedded controller and limited resources (i.e., limited memory capacity, display area and file system space), and the computing device operates to generate and retrieve/receive freshness statuses associated with U/I actions, in controlling the processing of such U/I actions.

In one or more embodiments, the system used to process U/I actions generated from a U/I device interacts with a runtime environment executing on the computing device that is used to simplify operation of the device, such as by providing generalized calls for device specific resources. One such runtime environment is the Binary Runtime Environment for Wireless® (BREW™) software platform developed by QUALCOMM, Inc., of San Diego, Calif. In at least one embodiment in the following description, the system used to process U/I actions generated from a U/I device on the computing device is implemented on a portable device executing a runtime environment, such as the BREW software platform. However, one or more embodiments of the system used to execute applications on the single active application environment computing device are suitable for use with other types of runtime environments to control the execution of applications on single active application environment computing devices.

Figure 1:
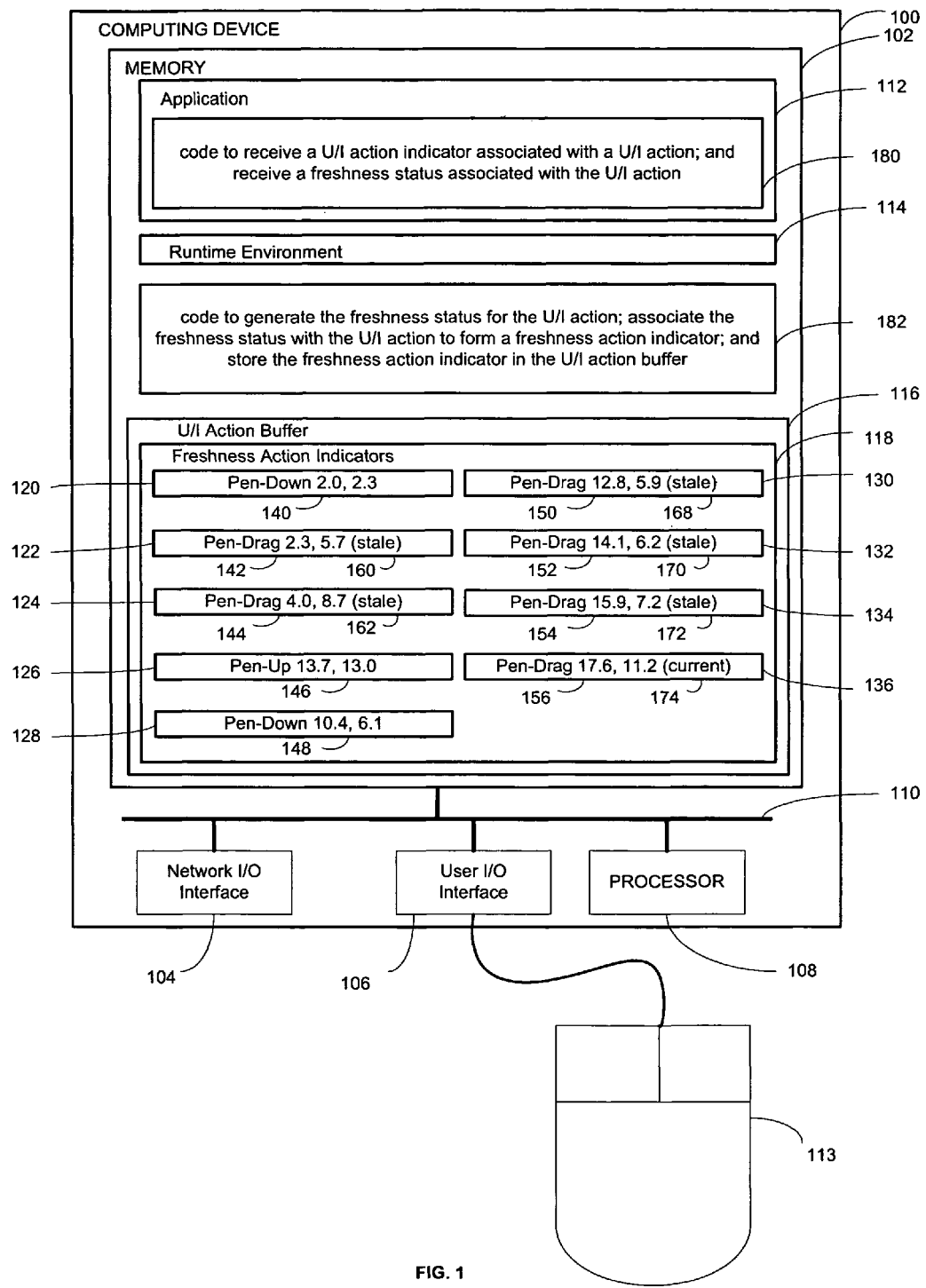
FIG. 1 shows a block diagram of one embodiment of a computing device for processing U/I actions generated from a U/I device.

FIG. 1 illustrates one exemplary embodiment of a computing device 100 for processing U/I actions generated from a U/I device. As used herein "computing device" includes: one or more processing circuits executing software modules stored in memory, such as microprocessors, digital signal processors (DSPs), microcontrollers, portable wireless telephones, personal digital assistants (PDAs), and paging devices, or any suitable combination of hardware, software stored in memory and/or firmware wherein a single active application is maintained. The computing device 100 includes a memory 102, network I/O interface 104, user I/O interface 106, processor 108 and bus 110. Although the memory 102 is shown as one contiguous unit of RAM, other embodiments use multiple locations and multiple types of memory as memory 102. The network I/O interface 104 provides input and output to all devices connected to the network via the bus 110. The user I/O interface 106 provides input and output to the user of the single active application environment computing device 100, via U/I devices 113 such as a keyboard, mouse, touch screen, joy stick, and the like. The processor 108 operates on instructions and data provided via the bus 110.

Shown located within memory 102 is an application 112, runtime environment 114, and U/I action buffer 116. The application 112 represents any application that is compatible with the computing device 100 and is capable of interaction with the U/I action buffer 116. As mentioned above, the runtime environment 114 executes on the computing device 100 to simplify operation of the device, such as by providing generalized calls for device specific resources. Although the runtime environment shown is BREW™, other runtime environments 114 providing similar functionality are used in other exemplary embodiments.

In one embodiment, the U/I action buffer 116 includes freshness action indicators 118 (120, 122, 124, 126, 128, 130, 132, 134 and 136). However, in another embodiment, such freshness action indicators 118 are not included in the associated buffer, but instead, are simply provided to the application using the information. Further, in yet another embodiment the items received from the U/I action buffer 116 (i.e., U/I action indicators) are used to subsequently generate corresponding freshness action indicators 118 prior to such items being sent to or processed by a processing application. The freshness action indicators 118 represent data used in the processing of U/I device actions. In at least one embodiment, such U/I action buffer 116 include any one or more freshness action indicators 118, where such freshness action indicators 118 may further include U/I action indicators 140, 142, 144, 146, 148, 150, 152 154 and 156. Although the U/I action indicators shown are each pen actions, other U/I action indicators, including keyboard actions or other like U/I actions, may also be present in the freshness action indicators 118. In addition, the freshness action indicators 118 may also include freshness indicators 160, 162, 168, 170, 172 and 174. In the embodiment shown, the freshness indicators 160, 162, 168, 170, 172 and 174 are only associated with segment based actions (see description below) such as the U/I action indicators U/I action indicators 140, 142, 144, 146, 148, 150, 152 154 and 156 that contain pen-down actions. In at least one embodiment, the freshness action indicators 118 are not stored in an associated buffer, but instead are generated subsequent to receiving an entry of the associated buffer and including in such entry a freshness indicator 160, 162, 164, 168, 170, 172 and 174. In such embodiments, prior art systems containing prior art buffers may be used where the contents of such buffers remain the same, and it is only after receiving the information from such buffers that the freshness indicators are associated therewith.

Further, in at least one embodiment, freshness action indicators 118 can be classified into two different types: point based actions/events and segment based actions/events. Point based action/events are U/I actions/events that typically represent specific point related actions/events rather than a series of point actions/events. In at least one embodiment, point based actions/events are typically considered more significant and segment based actions/events where point based actions/events largely rely on user selection and as such are not subject to change based on an associated polling rate. For example, point based actions/events typically include pen-down (120 & 128) and pen-up action/events (126). Here, such point based actions/events (120, 126 and 128) are specifically generated in response to a user picking out one particular point on a corresponding display.

In contrast, segment based actions/events typically are associated with the generation of a continuous segment, whether straight, diagonal, meandering, serpentine, or having any other like path, that reflects a series of continuous points, that together, represent a series of generated points associated U/I actions/events and which are each separated by consecutive polling samples, rather than consecutively detected user U/I interaction. For example, segment based actions/events include, for example, pen-drag action/events (122, 124) & (130, 132, 134 and 136). Such segment based actions/events are generally generated in response tracing a path on a display for which the corresponding polling rate defines which points/coordinates along such path will be considered the actual segment based actions/events. Here, the user interaction represents the drawing of a segment of a string of points, rather than the selection of any particular point.

In at least one embodiment, the freshness indicators 160, 162, 168, 170, 172 and 174, are only associated with segment based actions/events. In such embodiments this is because the "stale" and "current" values are seen as only having meaning with respect to those U/I actions/events that are separated by a single time slice, rather than by a user determined period, where "stale" indicates a U/I action/event that has been superseded by a subsequent U/I action/event, and where "current" indicates a U/I action/event that has not yet been superseded by such a subsequent U/I action/event. Further, in at least one embodiment freshness action indicators 118 having an associated freshness indicator (160, 162, 168, 170, 172 and 174) of "current," means that such freshness action indicator 118 was recorded at the most recently expired time slice.

The freshness action indicators 118 may also include other like information that may be stored in any number of memory types, including RAM, ROM, registers, flash memory and the like, and may be stored in any suitable data structure. Although the freshness action indicators 118 are shown as including only two states: stale and current, other embodiments use additional states for tracking other historical information associated with the U/I action indicators. Here, the "current" state represents a currently active U/I action indicator. For example, if an interactive screen is sensing that a pen is currently in contact with the screen, then a current pen action 156, for example, pen-drag at location 17.6x and 11.2y, is indicated as having a freshness indicator 174 with a value of "current." Similarly, an immediately previous freshness action indicator 134, with the introduction of the new current freshness action indicator 136, has its freshness indicator 172 changed from "current" to "stale." In at least one embodiment, pen-up and pen-down events cannot be associated with a "stale" status, as they are considered, in such embodiment, as point based actions/events rather than segment based actions/events and are otherwise absent a similar need for a "stale" status.

In the current embodiment, at most one U/I action indicator is considered "current" at any instant in time. As shown, all earlier generated freshness action indicators 122, 124, 130, 132 and 134, that represent a segment based action, have a freshness indicator 160, 162, 168, 170 and 172 of "stale." In at least one embodiment, pen-up events are never either "current" or "stale" because it is considered a point based event rather than a segment based event. As such, the freshness action indicator 126, for example, has never had an associated freshness indicator.

The application 112 is shown to contain code 180 to receive a U/I action indicator 140, 142, 144, 146, 148, 150, 152 154 and 156, associated with a U/I action; and receive a freshness status associated with the U/I action. In one embodiment, for example, the received I/O action indicator and the received freshness status can be processed by the application 112. For example, the application 112 may be programmed such that it is only processes freshness action indicators 118 having a freshness indicator 160, 162, 168, 170, 172 and 174, of "current." This is true, for example, where the application 112 may be a desk top display application where the application 112, during an icon drag-and-drop, is only concerned with the current location of the icon, rather than the path along which the icon was dragged. (See FIG. 2). In another embodiment, for example, the application 112 may be programmed such that it processes all U/I action indicator regardless of the values of the associated freshness indicators 160, 162, 168, 170, 172 and 174. This is true, for example, where the application 112 may be a writing recognition algorithm where the application 112, during the time when the device is receiving input of from the interaction of a pen with the device screen, such that each recorded location of the pen, or at least a high percentage thereof, is used by the application 112 in performing its function. (See FIG. 2).

In one embodiment, the memory includes code 182 to generate the freshness status for the U/I action, associate the freshness status with the U/I action to form a freshness action indicator 118, and store the freshness action indicator 118 in the U/I action buffer 116. Other embodiments do not store the freshness action indicators 118 in the U/I action buffer, but instead assemble the freshness action indicators 118 based on U/I action indicators stored in the U/I action buffer 116. Although shown located separate from the runtime environment 114 and the application 112, such code 182 may be located in any suitable location throughout the computing device 100 such that it can perform its particular function. In the embodiment shown, the code 182 operates to evaluate whether an incoming U/I action is to be considered "current" or "stale." After such evaluation the code 182 operates to associate a freshness indicator 160, 162, 168, 170, 172 and 174, where present, with the associated U/I action indicator 140, 142, 144, 146, 148, 150, 152 154 and 156, to generate the freshness action indicator 120, 122, 124, 126, 128, 130, 132, 134 and 136, and in one embodiment, to store the freshness action indicator in the U/I action buffer 116. After such operation, the corresponding code 180 is then free to process the new information by reading the same information from the U/I action buffer 116. In at least one embodiment, when "current" incoming U/I actions arrive, previously identified "current" applications are updated to "stale." In some embodiments the "current" state is presumed to be that one freshness action indicator located at the top of the U/I action buffer 116, wherein any earlier entries are presumed to have a status of "stale." In another embodiment, all entries in the U/I action buffer 116 are considered "stale," while only newly received U/I actions are considered as potentially being considered "current."

However, in at least one other embodiment, the freshness indicator 160, 162, 166, 168, 170, 172 and 174, rather than being associated with the freshness action indicator at, or prior to, the time the freshness action indicator is stored in a buffer, such freshness indicator 160, 162, 164, 166, 168, 170, 172 and 174, is instead associated with the freshness action at, or after, the time such information is removed from a queue in which such information has been stored. Also, the determination of whether a freshness action indicator should be considered as "current" is determined based upon its location in a corresponding queue. For example, if the freshness action indicator is a segment based action/event, and it is located at the top of a corresponding queue, then as the most recently recorded freshness action indicator, and because it is of the type of a segment based action/event, then it can be determined that such freshness action indicator has a status of "current." As such, such functionality represents the determination of the freshness indicator 160, 162, 166, 168, 170, 172 and 174 at a time subsequent to the storage of the corresponding freshness action indicator. As such, the associated freshness indicator 160, 162, 166, 168, 170, 172 and 174 may be determined when an application receives the freshness action indicator from the queue, and need not be determined prior to such instant.

Although the U/I action buffer 116 is shown to be located in memory 102, such information may be stored in a variety of locations, both internal and external to the computing device 100, and may be stored in a variety of forms, such as in linked-lists, arrays, databases or other data structures, and may be either hardware or software based. Further, in one embodiment, the U/I action buffer 116 may be the same or similar to the U/I action buffers present in currently available systems, except that the contents now include freshness action indicators 118 rather than U/I action indicators 140, 142, 144, 146, 148, 150, 152 154 and 156. In another embodiment, the U/I action buffer 116 may be the same or similar to the high or low-resolution buffers present in current systems, except that the contents include freshness action indicators 118 rather than U/I action (or event) indicators 140, 142, 144, 146, 148, 150, 152 154 and 156. In another embodiment the U/I action buffer 116 may be unlike the high and low-resolution buffers found in presently existing systems, for example the entries therein include an additional indicator containing the freshness indicators of associated U/I actions.

The ability for applications 112 to directly access freshness action indicators 120, 122, 124, 126, 128, 130, 132, 134 and 136, that contain corresponding freshness indicators 160, 162, 166, 168, 170, 172 and 174, allows such applications 112 greater autonomy as to how they operate in that such applications 112 can be programmed to utilize, for example, only U/I actions that are considered "current," while ignoring all those that are considered "stale." Likewise, other applications 112 can be programmed to utilize all U/I actions regardless as to whether they are considered "current" or "stale." Such operation and functionality is absent from current systems which use both high and low-resolution buffers as well as dedicated applications to process incoming U/I actions and events.

In one embodiment, freshness action indicators 120, 122, 124, 126, 128, 130, 132, 134 and 136, queue up in the U/I action buffer 116 until such freshness action indicators 120, 122, 124, 126, 128, 130, 132, 134 and 136 are ready to be sent to an application to be processed. Similarly, for those embodiments that assemble the freshness action indicators 120, 122, 124, 126, 128, 130, 132, 134 and 136, based on U/I actions received from the U/I action buffer, additional U/I actions also queue up in the U/I action buffer 116 until such U/I actions are received from the U/I action buffer 116 and sent to a target application to be processed.

Figure 2:
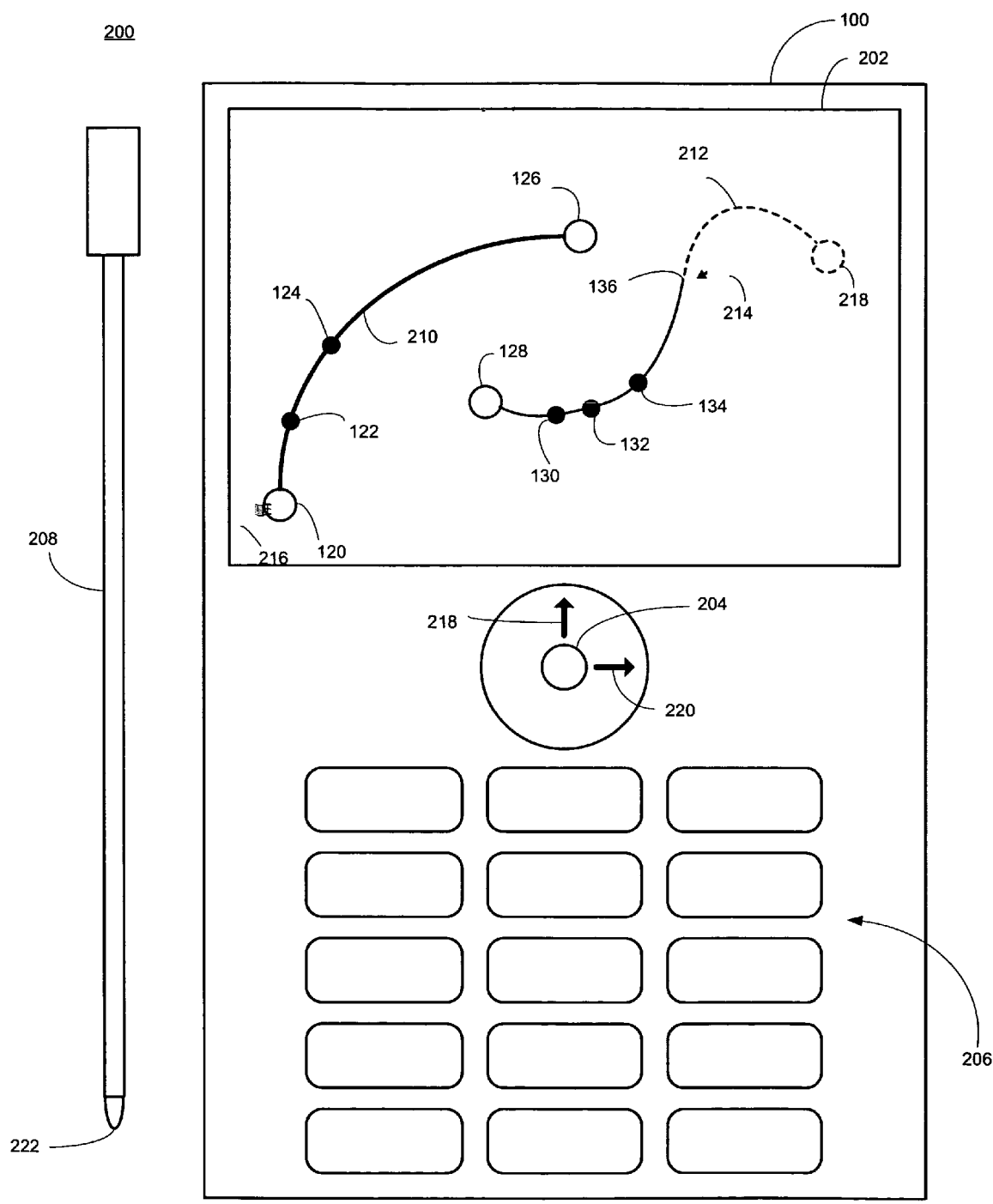
FIG. 2 shows a diagram of one embodiment of a computing device for processing U/I actions generated from a U/I device.

FIG. 2 illustrates a diagram of one exemplary embodiment 200 of the computing device 100 for processing U/I actions generated from a U/I device 113. Specifically, FIG. 2 shows the computing device 100 having U/I devices 113 and components including a touch-screen display 202, joystick 204, keypad 206 and pen 208. The U/I devices 113 may be used to produce the corresponding arc movements 210 and 212 as were generated via cursor 214. As shown, the device receives input to move the cursor 214 in the first arc movement 210, and then in the second arc movement 212. As shown, the cursor 214 is dragging an icon 216 across the touch-screen display 202 where, as shown, the icon 216 is currently still being redrawn at a location corresponding to freshness action indicator 120. Although cursor 214 is currently at a location corresponding to freshness action indicator 136, the icon is continuing to be displayed at the location corresponding to freshness action indicator 120 because the application which is displaying the icon has not completed its execution to fully display the icon at the given location. Also shown in the figure, beyond the current cursor 214 location, is shown an additional portion of the arc movement 212 (dotted line) to be received as input at the computing device in response to a subsequent movement of the cursor 214 by the user. Such arc movement 212 is completed with a final U/I action 218 of a pen-up action. As shown arc movement 210 includes the screen locations points associated with the first four freshness action indicators 120, 122, 124 and 126 while the arc movement 212 includes the screen locations points associated with the second five action indicators 128, 130, 132, 134 and 136.

To generate the arc movements 210 and 212, the pen 208, having a pen tip 222, may be used in conjunction with the touch-screen display 202 to generate the corresponding U/I actions. Also, the joystick 204 may be moved in a variety of directions, including in a pure y-direction 218 and in a pure x-direction 220, to also generate the corresponding U/I actions. Further, in at least one embodiment, the keypad 206 may be used alone, or in conjunction with other U/I devices 113 to generate the corresponding U/I actions.

Figure 3:
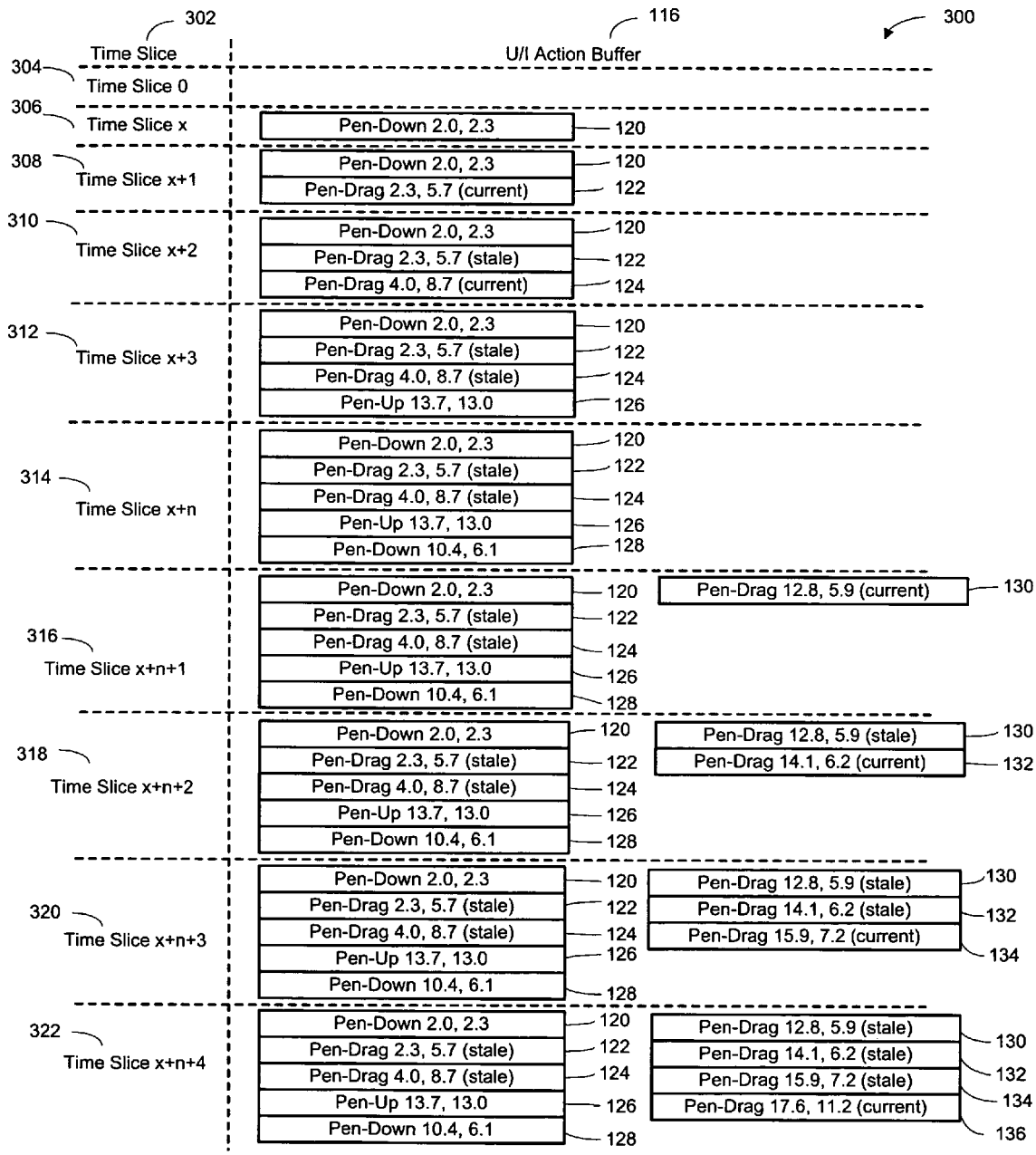
FIG. 3 shows a state table reflecting data corresponding to one embodiment of a computing device for processing U/I actions generated from a U/I device.

FIG. 3 illustrates a state table 300 reflecting data corresponding to one embodiment of a computing device 100 for processing U/I actions generated from a U/I device 113. Specifically, FIG. 3 shows the contents of the user U/I action buffer 116 over time slices 302 where the computing device 100 receives U/I action information from the U/I device 113. The contents of state table 300 correspond to the arc movements 210 and 212 of FIG. 2. In the following embodiment, an original icon is continuing to be drawn at the first freshness action indicator 120, while the remainder of the freshness action indicators 122, 124, 126, 128, 130, 132, 134 and 136, are recorded. Because the original icon continues to be drawn by a corresponding application, the freshness action indicators continue to queue up in the U/I action buffer.

At time slice 0 304, before any U/I actions are detected, the user action I/O buffer 116 is absent any freshness action indicators 118. At a next time slice, time slice x 306, after the U/I device 113 generates the freshness action indicator 120, the user action I/O buffer 116 is populated with the freshness action indicator 120 indicating a U/I action indicator (pen-down action) 140 (See FIG. 1). At this location an associated application uses such freshness action indicator 120 information to begin imaging an icon at such screen location and continues imaging at such location while the remaining U/I actions (122, 124, 126, 128, 130, 132, 134 and 136) are received. At time slice x+1 308, a new U/I action is detected with a corresponding freshness action indicator 122, indicating a specific U/I action indicator (pen-drag action) 142 (See FIG. 1), and a freshness indicator of "current." At time slice x+2 310, a new U/I action is detected with a corresponding freshness action indicator 124, indicating a specific U/I action indicator (pen-drag action) 144, and a freshness indicator of "current." At the same time slice, the freshness action indicator representing the previous freshness action indicator 122 is set to "stale." At time slice x+3, a new U/I action is detected with a corresponding freshness action indicator 126, indicating a specific U/I action indicator (pen-up action) 144. Note, because in this embodiment pen-up actions (i.e., point based action/events) never have a status, even though such U/I action indicator 146 is the most recent, it does not get marked with a "current" status. At the same time slice, the freshness action indicator representing the previous freshness action indicator 124 is set to "stale."

At time slice x+n 314, a time slice representing some time slice after time slice x+3 312, a new U/I action is detected with a corresponding freshness action indicator 128, indicating a specific U/I action indicator (pen-down action) 148. At time slice x+n+1 316 a new U/I action is detected with a corresponding freshness action indicator 130, indicating a specific U/I action indicator (pen-drag action) 150, and a freshness indicator of "current." At time slice x+n+2 318, a new U/I action is detected with a corresponding freshness action indicator 132, indicating a specific U/I action indicator (pen-drag action) 152, and a freshness indicator of "current." At the same time slice, the freshness action indicator representing the previous freshness action indicator 130 is set to "stale." At time slice x+n+3 318, a new U/I action is detected with a corresponding freshness action indicator 134, indicating a specific U/I action indicator (pen-drag action) 154, and a freshness indicator of "current." At the same time slice, the freshness action indicator representing the previous freshness action indicator 132 is set to "stale." Finally, at time slice x+n+4 318, a new U/I action is detected with a corresponding freshness action indicator 136, indicating a specific U/I action indicator (pen-drag action) 156, and a freshness indicator of "current." At the same time slice, the freshness action indicator representing the previous freshness action indicator 134 is set to "stale.122, 124, 126, 128, 130, 132, 134 and 136"

As discussed above, those particular applications 112 that are programmed to only process freshness action indicators 118 having a freshness indicator with a value of "current," will operate to only process those freshness action indicators 118, that, at any particular time, contain such a "current" value. In at least one embodiment, (i.e., the embodiment shown in FIG. 3), only one freshness action indicator 118 may have a "current" value at any one particular point in time. Similarly, for those applications 112, that are programmed to process all freshness action indicators 118, regardless of the contents of the freshness indicator, such applications 112 operate on all the freshness action indicators.

Further, for those embodiments where freshness action indicators 118 are built only after receiving corresponding U/I action indicators from U/I action buffer 116, (i.e., where U/I action indicators are stored in such buffer rather than an freshness action indicators), then such freshness action indicators 118 are not stored in such U/I action buffer 116 as shown. Instead such freshness action indicators 118 are built using the contents of such the U/I action buffer 116, where, at least in one embodiment, the freshness action indicator 118 has its status determined based upon whether the corresponding U/I action indicator is at the top of the U/I action buffer 116, or by other methods described above for determining the status of a U/I action indicator stored in a U/I action buffer 116.

FIG. 4 illustrates a flowchart of one exemplary embodiment 400 for a method that executes applications on a single active application environment computing device. Specifically, FIG. 4 describes the setting of freshness indicators based on U/I actions received by the computing device 100. The process begins at step 402 where initial execution of the application begins. Following step 402 is step 404 where the system detects the presence of a next U/I action. Following step 404 is step 406 in which the system determines if the previous U/I action was a segment based action. If yes, then step 408 is initiated in which the system sets the freshness indicator for the previous U/I action to "stale." Following either step 406 or step 408 is step 410 wherein the system determines if the next U/I action is a segment based application. If yes, then step 412 is initiated in which the system sets the freshness indicator for the next U/I action to "current." The method continues execution such that following steps 410 or 412, the system continues processing the next U/I action at step 404.

FIG. 5 illustrates a flowchart of one exemplary embodiment 500 for a method that executes applications 112 on a computing device. Specifically, FIG. 5 describes only processing U/I actions that area associated with a freshness indicators having a status of "current." The process begins at step 502 where initial execution of the application begins. Following step 502 is step 504 in which the system receives a freshness action indicator having a freshness status of "current." Once such freshness action indicator has been selected, then the following step 506 is initiated. In step 506 the system processes the action indicator associated with the received freshness action indicator. This process may be repeated for each new time slice. Following step 506 is the terminating step 508.

FIG. 6 illustrates a flowchart of one exemplary embodiment 600 for a method that executes applications 112 on a computing device. Specifically, FIG. 6 describes processing all U/I actions regardless of the contents of the corresponding freshness indicators. The process begins at step 602 where initial execution of the application begins. Following step 602 is step 604 in which the system receives the next sequential freshness action indicator and ignores the freshness indicator. Once such freshness action indicator has been selected, then the following step 606 is initiated. In step 606 the system processes such freshness action indicators. This process may be repeated for each new time slice. Following step 606 is the terminating step 608.

Figure 7:
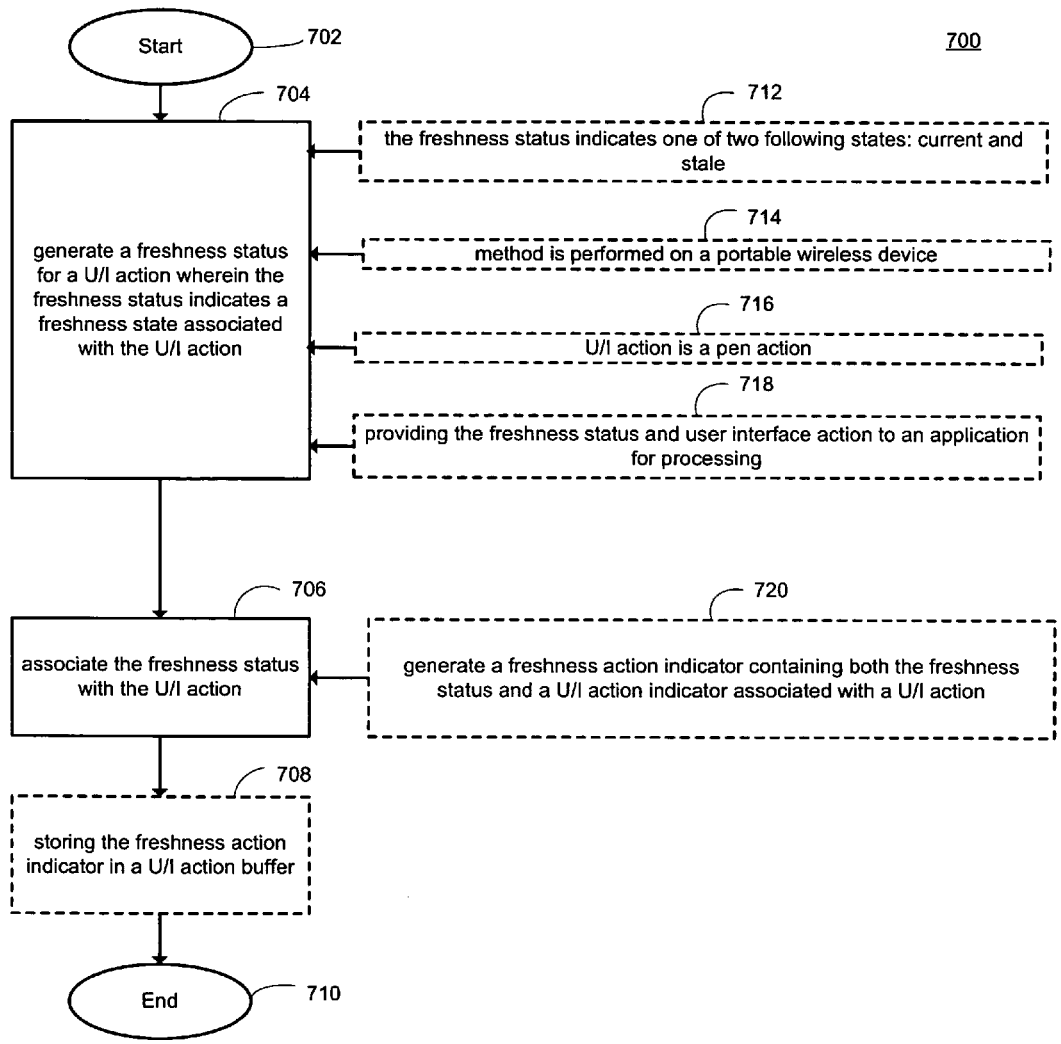
FIG. 7 shows a flow chart of one embodiment of a method of executing applications on a single active application environment computing device using application state history information.

FIG. 7 illustrates one exemplary embodiment 700 of a method of processing U/I actions generated from a U/I device 113. Specifically, FIG. 7 describes a method where, after a starting at node 702, step 704 is initiated wherein the system generates a freshness status for a U/I action wherein the freshness status indicates a freshness state associated with the U/I action. Following step 704 is step 706 in which the system associates the freshness status with the U/I action. Following step 706 is optional step 708 in which the system optionally stores the freshness action indicator in a U/I action buffer 116. Following the step 706 (and optional step 708) is the end of the method indicated with end node 708.

In addition FIG. 7 also shows a number of additional optional criteria and steps 712, 714, 716, 718 and 720. Specifically optional criteria and steps 712, 714, 716 and 718 each modify step 704 and the remaining step modifies step 706. First step 704 is optionally modified (712) wherein the freshness status indicates one of two following states: current and stale. Also, step 704 is optionally modified (714) wherein the method is performed on a portable wireless device. Step 704 is optionally modified (716) wherein the U/I action is a pen action. Step 704 is also optionally modified (718) where an additional step is added including the providing the freshness status and user interface action to an application for processing is performed. Finally, step 706 is modified (720) to include the step of generating a freshness action indicator 118 containing both the freshness status and a U/I action indicator 140, 142, 144, 146, 148, 150, 152, 154 and 156, associated with a U/I action.

Figure 8:
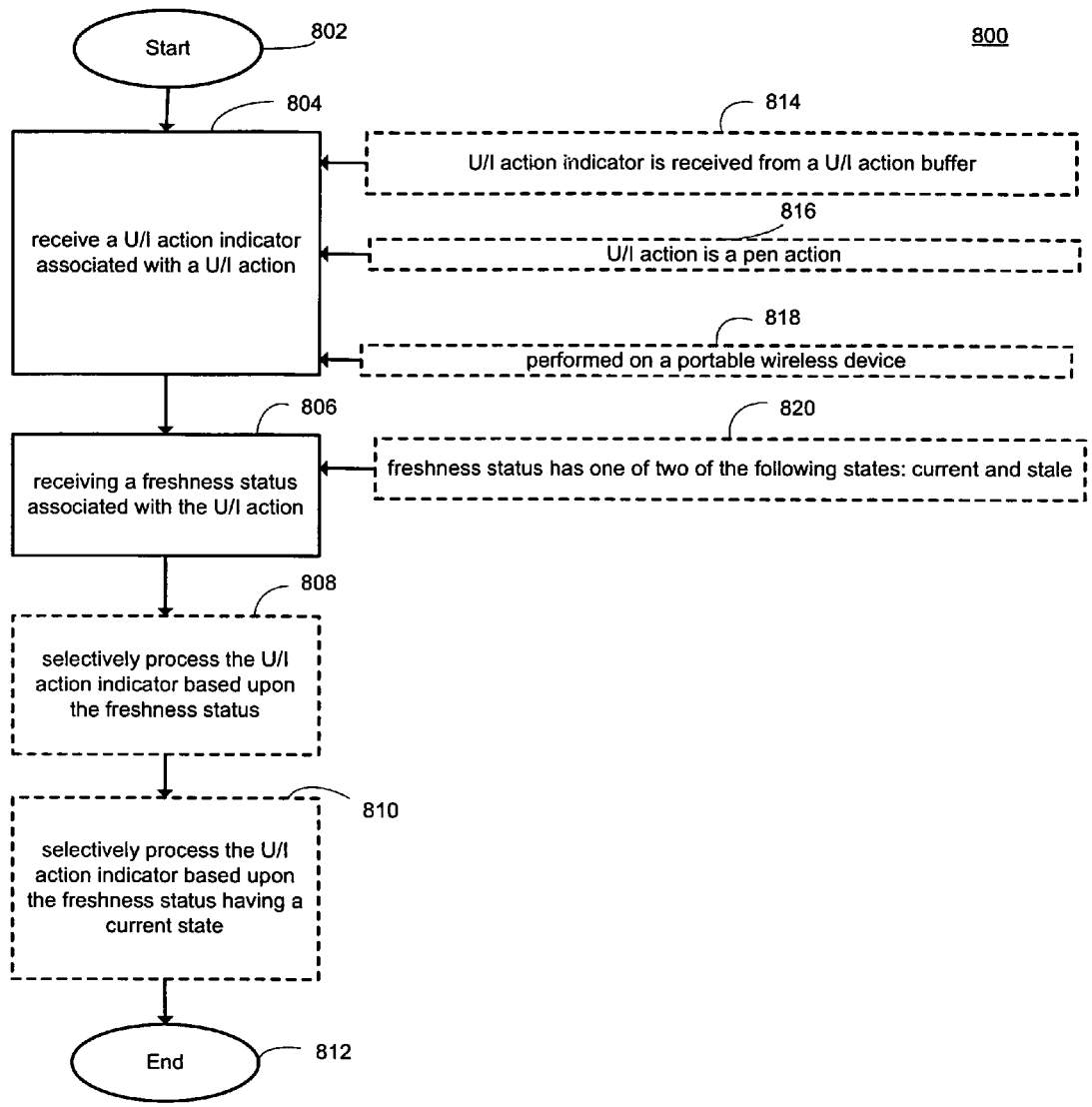
FIG. 8 shows a flow chart of one embodiment of a method of processing U/I actions generated from a U/I device.

FIG. 8 illustrates one exemplary embodiment 800 of a method of processing U/I actions generated from a U/I device 113. Specifically, FIG. 8 describes a method where, after a starting at node 802, step 804 is initiated wherein the system receives a U/I action indicator associated with a U/I action. Following step 804 is step 806 in which the system receives a freshness status associated with the U/I action. Following step 806 are two optional steps 808 and 810. Optional step 808 includes wherein the system selectively processes the U/I action indicator based upon the freshness status. Optional step 810 includes wherein the system selectively processes the U/I action indicator based upon the freshness status having a "current" state. Following the step 810 is the end of the method indicated with end node 812.

In addition FIG. 8 also shows a number of additional optional criteria and steps 814, 816, 818 and 820. Specifically optional criteria and steps 814, 816 and 818 each modify step 804 and the remaining modify step 806. First step 804 is optionally modified (814) wherein the U/I action indicator 140, 142, 144, 146, 148, 150, 152, 154 and 156, is received from a U/I action buffer 116. Also, step 804 is optionally modified (816) wherein U/I action is a pen action. Step 804 is optionally modified (818) wherein the method is performed on a portable wireless device. Finally, step 806 is modified (820) wherein freshness status has one of two of the following states: current and stale.

Figure 9:
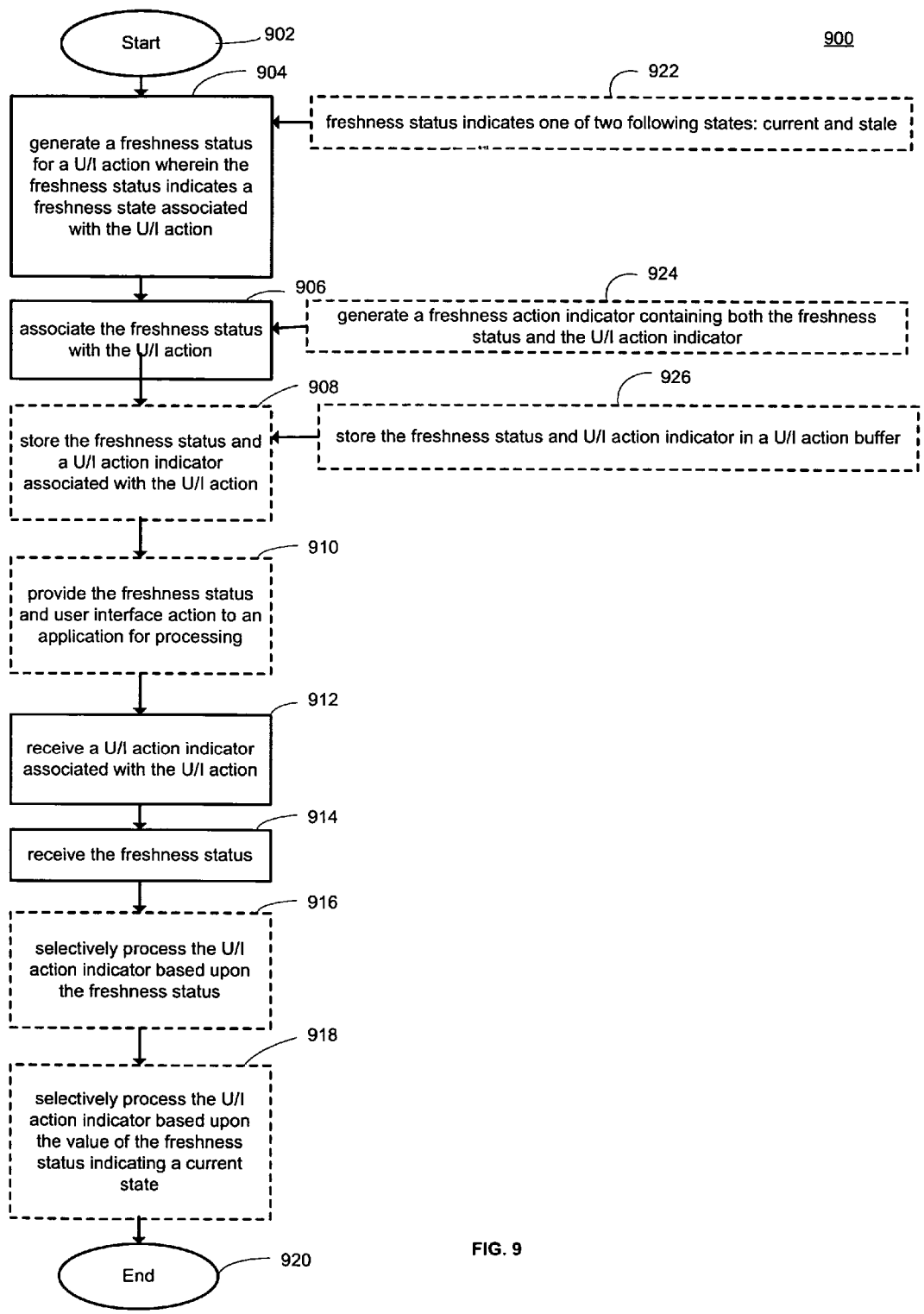
FIG. 9 shows a flow chart of one embodiment of a method of processing U/I actions generated from a U/I device.

FIG. 9 illustrates one exemplary embodiment 900 of a method of processing U/I actions generated from a U/I device 113. Specifically, FIG. 9 describes a method where, after a starting at node 902, step 904 is initiated wherein the system generates a freshness status for a U/I action wherein the freshness status indicates a freshness state associated with the U/I action. Following step 904 is step 906 in which the system associates the freshness status with the U/I action. Following step 906 is optional step 908 in which the system stores the freshness status and a U/I action indicator associated with the U/I action. Following optional step 908 is step 910 in wherein the system optionally provides the freshness status and U/I action to an application for processing. Following optional step 910 is step 912 in which the system receives a U/I action indicator 140, 142, 144, 146, 148, 150, 152, 154 and 156, associated with the U/I action. Following step 912 is step 914 in which the system receives the freshness status. Following step 914 are two optional steps 916 and 918. Optional step 916 includes wherein the system selectively processes the U/I action indicator 140, 142, 144, 146, 148, 150, 152, 154 and 156, based upon the freshness status. Optional step 918 includes wherein the system selectively process the U/I action indicator 140, 142, 144, 146, 148, 150, 152, 154 and 156, based upon the value of the freshness status indicating a "current" state. Following the step 918 is the end of the method indicated with end node 920.

In addition FIG. 9 also shows a number of additional optional criteria and steps 922, 924 and 926. Step 904 is optionally modified (922) wherein the freshness status indicates one of two following states: current and stale. Step 906 is optionally modified (924) wherein the method includes the additional step wherein the system generates a freshness action indicator 118 containing both the freshness status and the U/I action indicator 140, 142, 144, 146, 148, 150, 152, 154 and 156. Step 908 is optionally modified (926) wherein the method includes the additional step wherein the system stores the freshness status and U/I action indicator 140, 142, 144, 146, 148, 150, 152, 154 and 156, in a U/I action buffer 116.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of processing user interface actions generated from a user interface device having a touch screen, the method comprising:

receiving a first user interface action;

prior to communicating the first user interface action to an application, determining whether the first user interface action is a segment based action, wherein the segment based action comprises a pen dragging action, wherein the pen dragging action comprises contact by the pen on the touch screen;

if the first user interface action is determined to be a segment based action, generating a first freshness status for the first user interface action wherein the first freshness status indicates a current state associated with the first user interface action, the current state indicating that the user interface action is not superseded by a subsequent user interface action;

associating the first freshness status with the user first interface action to create a first freshness action indicator;

storing the first freshness action indicator in a user interface action buffer;

while the first freshness action indicator is stored in a user interface action buffer, receiving a second user interface action;

prior to communicating the second user interface action to the application, determining whether the second user interface action is a segment based action, wherein the segment based action comprises a pen dragging action, wherein the pen dragging action comprises contact by the pen on the touch screen;

if the second user interface action is determined to be a segment based action, generating a second freshness status for the second user interface action wherein the second freshness status indicates a current state associated with the second user interface action;

changing the first freshness status to indicate a stale state for the first user interface action, the stale state indicating that the first user interface action is superseded by the second user interface action;

storing the second freshness action indicator in the user interface action buffer; and selectively communicating the first freshness action indicator and the second freshness action indicator to an application based on the first freshness status and the second freshness status, wherein the first user interface action is ignored by the application based on the first freshness status indicating a stale state, and the second user interface action is communicated to the application based on the second freshness status indicating a current state.

2. The method of claim 1, wherein the method is performed on a portable wireless device.

3. The method of claim 1, further comprising:

wherein the first user interface action and the second user interface action comprise dragging an icon from a first location associated with the first user interface action to a second location associated with the second user interface action on the touch screen, wherein the icon is displayed at the first location until the application has processed the second user interface action; and displaying the icon at the second location after the application has processed the second user interface action.

4. The method of claim 1, wherein the storing further comprises storing a user interface action with a current state at the top of a queue in the user interface action buffer.

5. A method of processing user interface actions generated from a user interface device having a touch screen, the method comprising:

receiving a first user interface action indicator associated with a first user interface action;

prior to communicating the first user interface action to an application, determining whether the first user interface action is a segment based action, wherein the segment based action comprises a pen dragging action, wherein the pen dragging action comprises contact by the pen on the touch screen;

if the first user interface action is determined to be a segment based action, receiving a first freshness action indicator which comprises a first freshness status associated with the first user interface action, and wherein the first freshness status indicates a current state, the current state indicating that the first user interface action is not superseded by a subsequent user interface action;

receiving a second user interface action indicator associated with a second user interface action;

prior to communicating the second user interface action to the application, determining whether the second user interface action is a segment based action, wherein the segment based action comprises a pen dragging action, wherein the pen dragging action comprises contact by the pen on the touch screen;

if the second user interface action is determined to be a segment based action, receiving a second freshness action indicator which comprises a second freshness status associated with the second user interface action, and wherein the second freshness status indicates a current state, the current state indicating that the second user interface action is not superseded by a subsequent user interface action;

changing the first freshness status to indicate a stale state for the first user interface action, the stale state indicating the first user interface action is superseded by the second user interface action; and selectively communicating the first freshness action indicator and the second freshness action indicator to an application based on the first freshness status and the second freshness status, wherein the first user interface action is ignored by the application based on the first freshness status indicating a stale state, and the second user interface action is communicated to the application based on the second freshness status indicating a current state.

6. The method of claim 5, wherein the method is performed on a portable wireless device.

7. The method of claim 5, further comprising:
wherein the first user interface action and the second user interface action comprise dragging an icon from a first location associated with the first user interface action to a second location associated with the second user interface action on a touch screen, wherein the icon is displayed at the first location until the application has processed the second user interface action;, and displaying the icon at the second location after the application has processed the second user interface action.

8. A computing device for processing user interface actions generated from a user interface device, comprising:
a memory;
a user input/output interface configured to receive user interface action signals from a user interface device; and
a processor coupled to the memory and operable to execute code to:
receive a first user interface action;
prior to communicating the first user interface action to an application, determine whether the first user interface action is a segment based action, wherein the segment based action comprises a pen dragging action, wherein the pen dragging action comprises contact by the pen on the touch screen;
if the first user interface action is determined to be a segment based action, generate a first freshness status for the first user interface action wherein the first freshness status indicates a current state associated with the first user interface action, the current state indicating that the user interface action is not superseded by a subsequent user interface action;
associate the first freshness status with the user first interface action to create a first freshness action indicator;
store the first freshness action indicator in a user interface action buffer;
while the first freshness action indicator is stored in a user interface action buffer, receive a second user interface action;
prior to communicating the second user interface action to the application, determine whether the second user interface action is a segment based action, wherein the segment based action comprises a pen dragging action, wherein the pen dragging action comprises contact by the pen on the touch screen;
if the second user interface action is determined to be a segment based action, generate a second freshness status for the second user interface action wherein the second freshness status indicates a current state associated with the second user interface action;
change the first freshness status to indicate a stale state for the first user interface action, the stale state indicating that the first user interface action is superseded by the second user interface action;
store the second freshness action indicator in the user interface action buffer; and
selectively communicate the first freshness action indicator and the second freshness action indicator to an application based on the first freshness status and the second freshness status, wherein the first user interface action is ignored by the application based on the first freshness status indicating a stale state, and the second user interface action is communicated to the application based on the second freshness status indicating a current state.

9. The computing device of claim 8, wherein the computing device is a portable wireless device.

10. The computing device of claim 8, further comprising:
wherein the processor is further operable to execute code to drag an icon from a first location associated with the first user interface action to a second location associated with the second user interface action on a touch screen, wherein the icon is displayed at the first location until the application has processed the second user interface action; and wherein the processor is further operable to display the icon at the second location after the application has processed the second user interface action.

11. The computing device of claim 8, wherein the processor is further operable to store a user interface action with a current state at the top of a queue in the user interface action buffer.

12. A computing device for processing user interface actions generated from a user interface device, comprising:
a memory;
a user interface action buffer configured to store a user freshness action indicator; and
a processor coupled to the memory and operable to execute code to:
receive a first user interface action indicator associated with a first user interface action;
prior to communicating the first user interface action to an application, determine whether the first user interface action is a segment based action, wherein the segment based action comprises a pen dragging action, wherein the pen dragging action comprises contact by the pen on the touch screen;
if the first user interface action is determined to be a segment based action, receive a first freshness action indicator which comprises a first freshness status associated with the first user interface action, and wherein the first freshness status indicates a current state, the current state indicating that the first user interface action is not superseded by a subsequent user interface action;
receive a second user interface action indicator associated with a second user interface action;
prior to communicating the second user interface action to the application, determine whether the second user interface action is a segment based action, wherein the segment based action comprises a pen dragging action, wherein the pen dragging action comprises contact by the pen on the touch screen;
if the second user interface action is determined to be a segment based action, receive a second freshness action indicator which comprises a second freshness status associated with the second user interface action, and wherein the second freshness status indicates a current state, the current state indicating that the second user interface action is not superseded by a subsequent user interface action;
change the first freshness status to indicate a stale state for the first user interface action, the stale state indicating the first user interface action is superseded by the second user interface action; and
selectively communicate the first freshness action indicator and the second freshness action indicator to an application based on the first freshness status and the second freshness status, wherein the first user interface action is ignored by the application based on the first freshness status indicating a stale state, and the second user interface action is communicated to the application based on the second freshness status indicating a current state.

13. The computing device of claim 12, wherein the computing device is a portable wireless device.

14. The computing device of claim 12, further comprising:
wherein the processor is further operable to execute code to drag an icon from a first location associated with the first user interface action to a second location associated with the second user interface action on a touch screen, wherein the icon is displayed at the first location until the application has processed the second user interface action; and
wherein the processor is further operable to display the icon at the second location after the application has processed the second user interface action.

15. The computing device of claim 12, wherein the processor is further operable to store a user interface action with a current state at the top of a queue in the user interface action buffer.

16. A computer program product embodied on a computer readable medium, the computer program capable of processing user interface actions generated from a user interface device, the computer program product comprising:
code operable to receive a first user interface action;
code operable to, prior to communicating the first user interface action to an application, determine whether the first user interface action is a segment based action, wherein the segment based action comprises a pen dragging action, wherein the pen dragging action comprises contact by the pen on the touch screen;
code operable to generate a first freshness status for the first user interface action if the first user interface action is determined to be a segment based action, wherein the first freshness status indicates a current state associated with the first user interface action, the current state indicating that the user interface action is not superseded by a subsequent user interface action;
code operable to associate the first freshness status with the user first interface action to create a first freshness action indicator;
code operable to store the first freshness action indicator in a user interface action buffer;
code operable to receive a second user interface action while the first freshness action indicator is stored in a user interface action buffer;
code operable to, prior to communicating the second user interface action to the application, determine whether the second user interface action is a segment based action, wherein the segment based action comprises a pen dragging action, wherein the pen dragging action comprises contact by the pen on the touch screen;
code operable to generate a second freshness status for the second user interface action if the second user interface action is determined to be a segment based action, wherein the second freshness status indicates a current state associated with the second user interface action;
code operable to change the first freshness status to indicate a stale state for the first user interface action, the stale state indicating that the first user interface action is superseded by the second user interface action;
code operable to store the second freshness action indicator in the user interface action buffer; and
code operable to selectively communicate the first freshness action indicator and the second freshness action indicator to an application based on the first freshness status and the second freshness status, wherein the first user interface action is ignored by the application based on the first freshness status indicating a stale state, and the second user interface action is communicated to the application based on the second freshness status indicating a current state.

17. The computer program product of claim 16, further comprising:
code operable to enable dragging an icon from a first location associated with the first user interface action to a second location associated with the second user interface action on a touch screen, wherein the icon is displayed at the first location until the application has processed the second user interface action; and
code operable to display the icon at the second location after the application has processed the second user interface action.

18. The computer program product of claim 16, wherein the computer program further comprises code operable to store a user interface action with a current state at the top of a queue in the user interface action buffer.

19. A computer program product embodied on a computer readable medium, the computer program capable of processing user interface actions generated from a user interface device, the computer program product comprising:
code operable to receive a first user interface action indicator associated with a first user interface action;
code operable to, prior to communicating the first user interface action to an application, determine whether the first user interface action is a segment based action, wherein the segment based action comprises a pen dragging action, wherein the pen dragging action comprises contact by the pen on the touch screen;

code operable to receive, if the first user interface action is determined to be a segment based action, a first freshness action indicator which comprises a first freshness status associated with the first user interface action, and wherein the first freshness status indicates a current state, the current state indicating that the first user interface action is not superseded by a subsequent user interface action;

code operable to receive a second user interface action indicator associated with a second user interface action;

code operable to, prior to communicating the second user interface action to the application, determine whether the second user interface action is a segment based action, wherein the segment based action comprises a pen dragging action, wherein the pen dragging action comprises contact by the pen on the touch screen;

code operable to receive, if the second user interface action is determined to be a segment based action, a second freshness action indicator which comprises a second freshness status associated with the second user interface action, and wherein the second freshness status indicates a current state, the current state indicating that the second user interface action is not superseded by a subsequent user interface action;

code operable to change the first freshness status to indicate a stale state for the first user interface action, the stale state indicating the first user interface action is superseded by the second user interface action; and code operable to selectively communicate the first freshness action indicator and the second freshness action indicator to an application based on the first freshness status and the second freshness status, wherein the first user interface action is ignored by the application based on the first freshness status indicating a stale state, and the second user interface action is communicated to the application based on the second freshness status indicating a current state.

20. The computer program product of claim 19, further comprising:

code operable to enable dragging an icon from a first location associated with the first user interface action to a second location associated with the second user interface action on a touch screen, wherein the icon is displayed at the first location until the application has processed the second user interface action; and code operable to display the icon at the second location after the application has processed the second user interface action.

21. The computer program product of claim 19, wherein the computer program further comprises code operable to store a user interface action with a current state at the top of a queue in the user interface action buffer.

* * * * *